Dec. 10, 1957 W. H. BARLOW 2,816,274
SPLIT-BOLT TYPE ELECTRICAL CONNECTORS
Filed May 3, 1954

INVENTOR
William H. Barlow
BY
*H. F. Johnston*
ATTORNEY

United States Patent Office 2,816,274
Patented Dec. 10, 1957

2,816,274

SPLIT-BOLT TYPE ELECTRICAL CONNECTORS

William H. Barlow, Waterbury, Conn., assignor to Scovill Manufacturing Company, Waterbury, Conn., a corporation of Connecticut Application May 3, 1954, Serial No. 427,319

2 Claims. (Cl. 339—244)

This invention relates to electrical connectors and more particularly to split-bolt connectors having a nut and clamping member or pressure element associated therewith.

In the construction of electrical connectors of the above type it is necessary to support the legs of the bolt by the clamping member or follower carried by the nut to prevent the legs from collapsing inwardly during the tightening of the nut. Heretofore the clamping members were made by cold heading, forging or interfitted sheet metal elements. When made as a forging or cold heading it would add to the cost of the material used as well as to the weight of the device and thus increase the cost of shipping. When constructed from sheet metal having interfitted elements made to commercially allowable tolerances, there was no assurance that the follower would support the legs against inward movement during tightening of the nut.

An object of this invention is to devise a reliable split-bolt connector in which the parts of the device can be economically made from strip metal. Control of the legs depends on the width of a single strip of metal which can be easily made within allowable tolerances to obtain the proper fit between the legs.

Other objects and advantages of this invention will be apparent from the following specification and accompanying drawings, wherein, Fig. 1 is a side elevation of an electrical connector embodying my invention.

Figure 1:
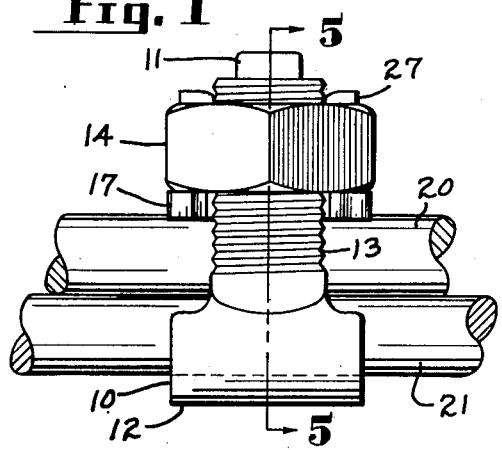
Figure 2:
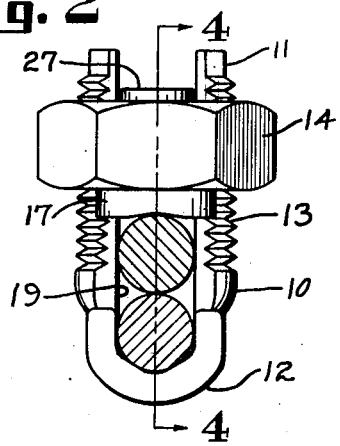
Fig. 2 is an end elevation of the same.
Figure 3:
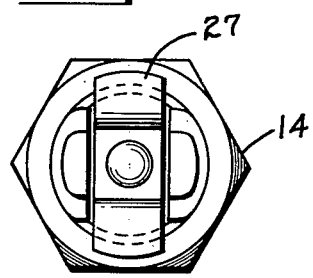
Fig. 3 is a plan view.

My improved connector employs the usual split bolt 10 having spaced legs 11 joined by a U-shaped saddle 12. The outer surfaces of the legs 11 are formed with threads 13 upon which is engaged a nut 14 having an internal thread 15.

A follower member 16 is swivelly connected to the nut 14 and consists of a clamping bar 17 and a center spacing bar 18. The bolt legs 11 have inner flat surfaces 19 which the follower member 16 slidably engages during the movement of the nut 14 along the legs 11 to rigidly clamp a pair of conductor wires 20 and 21 together, as seen in Fig. 1.

The clamping bar 17 preferably is made from flat stock having its lower surface stamped with a series of ridges 22 or otherwise roughened to effect a good grip on the adjacent conductor wire 20. The opposite edges of the bar 17 are clipped out to provide channels 23 that embrace the legs 11 and the upper flat surface 24 of said part provides a bearing surface against which the adjacent face of the nut 14 slidably engages.

The spacer bar 18 is made from a strip of flat stock of uniform width. This bar is formed into a substantially U-shaped arrangement providing a flat base portion 25 that seats against the clamping bar upper surface 24. Converging bearing arms 26 extend upwardly from the base 25 and terminate in outwardly formed flanges 27 that overlie the upper surface of the nut 14 and hold the follower member 16 thereon as a unit. The center of the clamping bar 17 has an integral rivet shank 28 extending upwardly therefrom and projecting through an opening 29 in the center bar base 25 and riveted over as at 30 as seen in Fig. 4 to permanently secure the clamping bar 17 and spacer bar 18 together.

The clamping bar 17 in having its side edges clipped to provide the channels 23 can have its cross width held to a very close dimension so as to assure a proper smooth sliding fit between the leg flat surfaces 19.

In the construction of the spacer bar 18 its finished width can be established by the strip stock from which it is manufactured so that there will be only one tolerance to be considered in establishing the proper fit between the leg surfaces 19.

Figure 4:
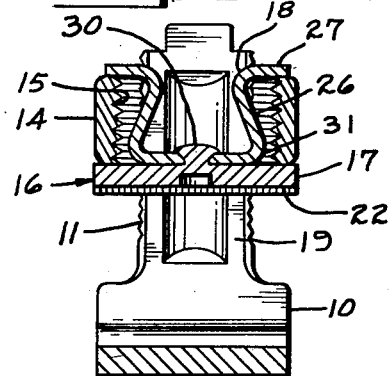
Fig. 4 is a longitudinal sectional view on line 4—4 of Fig. 2.
Figure 5:
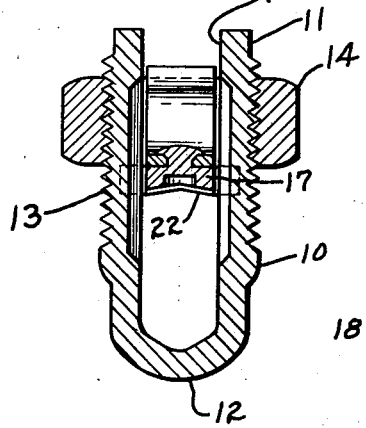
Fig. 5 is a transverse sectional view on line 5—5 of Fig. 1.
Figure 6:
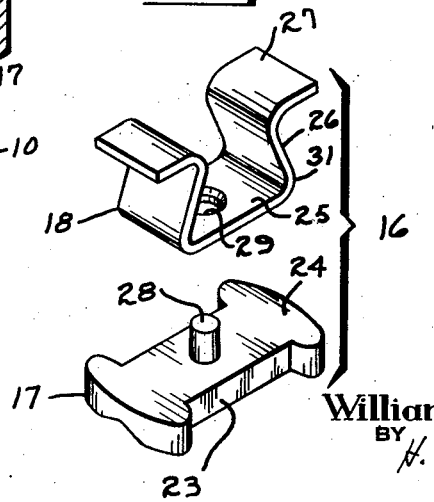
Fig. 6 is a perspective view of the sheet metal parts for making the clamping member.

From Fig. 4 it is to be noted that the converging arms 26 have a considerable portion of their opposite edges bearing against the flat surfaces 19 of the legs 11 to prevent said legs from collapsing inwardly coincident with the tightening of the nut 14 in establishing a clamping connection.

Furthermore, the length of the base portion 25 of the spacer bar 18 between the rounded corners 31 is such as to provide a smooth running fit within the threaded portion 15 of the nut 14 to prevent undue endwise play of the follower member 16.

It is, of course, obvious that minor changes in details of construction and arrangement of parts may be made without departing from the scope of the present invention as set forth in the combined claims.

I claim:

1. A connector for electrical conductors comprising a U-shaped threaded split bolt having opposed parallel inner faces, a nut for threaded engagement with said bolt, a follower member swivelly connected to the nut which consists of a clamping bar of relatively thick strip material extending diametrically straight across the inner side of the nut, the middle portion of said bar being of a width to fit slidably between the inner flat surfaces of the bolt legs while the end portions thereof are relatively wider to provide flat bearing surfaces slidably engaging the inner face of the nut, and a spacer bar formed as a separate piece of strip sheet material of the same which as the middle portion of said clamping bar and bent to provide a middle flat portion seating against said clamping bar, bearing arms extending from said flat mid portion and converging toward each other so as to extend between the inner surfaces of the bolt legs to support the same, said bearing arms terminating in outwardly extending flanges which overlie the outer side of the nut, and means for securing said spacer bar to the clamping bar.

2. A connector as defined in claim 1 wherein the means for securing the spacer bar to the clamping bar comprises a rivet integral with the clamping bar extending through an opening in the adjacent portion of the spacer bar.

References Cited in the file of this patent

UNITED STATES PATENTS

| | | |
|---|---|---|
| 1,943,677 | Kearney | Jan. 16, 1934 |
| 2,020,989 | Blackburn | Nov. 12, 1935 |
| 2,164,075 | O'Russa | June 27, 1939 |

UNITED STATES PATENT OFFICE

CERTIFICATE OF CORRECTION

Patent No. 2,816,274 December 10, 1957

William H. Barlow

It is hereby certified that error appears in the printed specification of the above numbered patent requiring correction and that the said Letters Patent should read as corrected below.

Column 2, line 49, for "which" read --width--.

Signed and sealed this 11th day of February 1958.

(SEAL)
Attest:

KARL H. AXLINE
Attesting Officer

ROBERT C. WATSON
Commissioner of Patents